J. CUSTER.
COMBINED POTATO AND CORN PLANTER.
No. 191,838. Patented June 12, 1877.
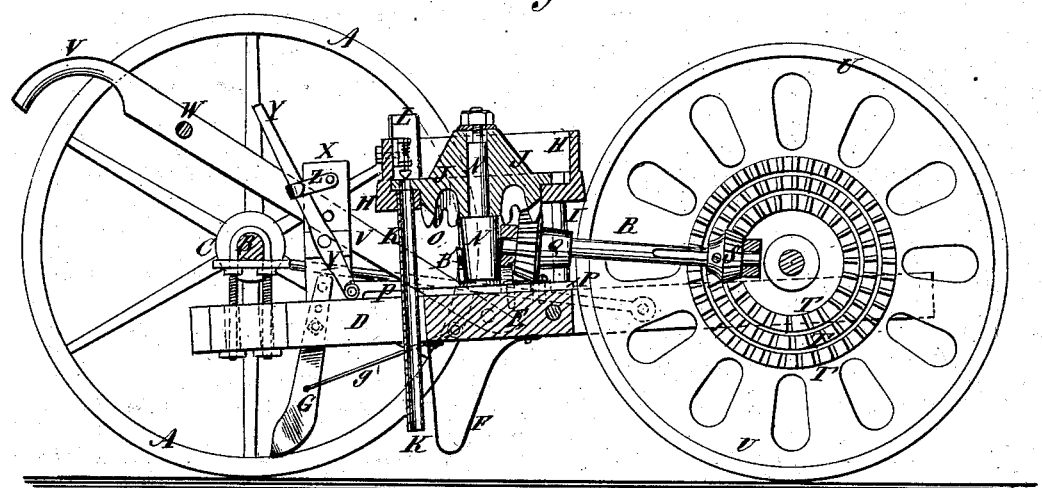
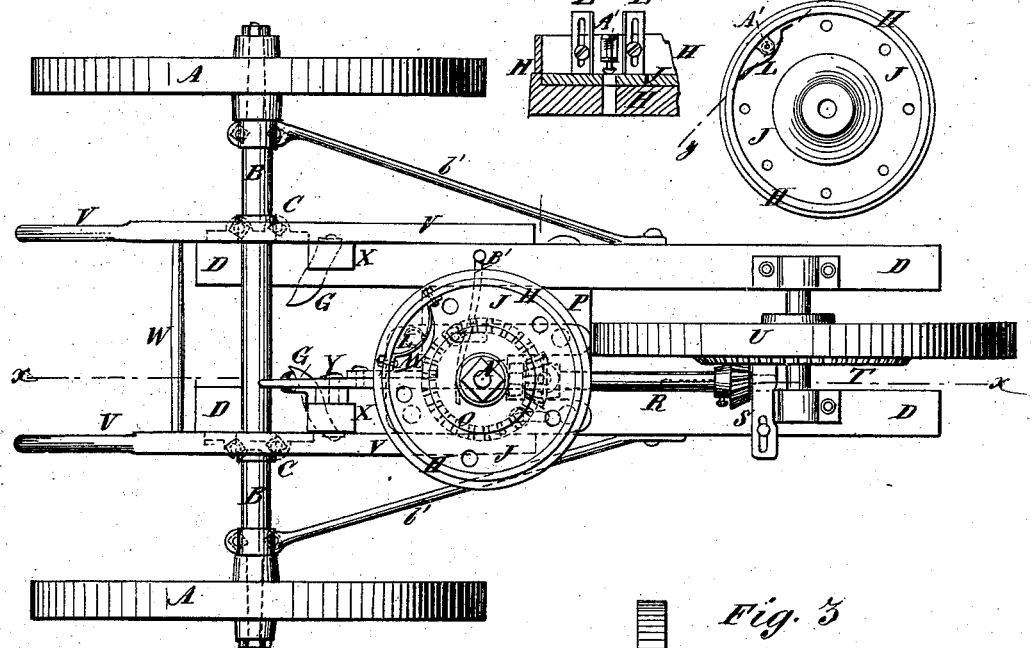
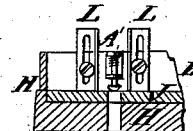
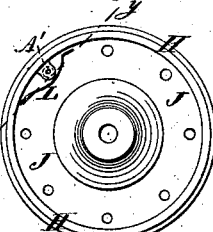
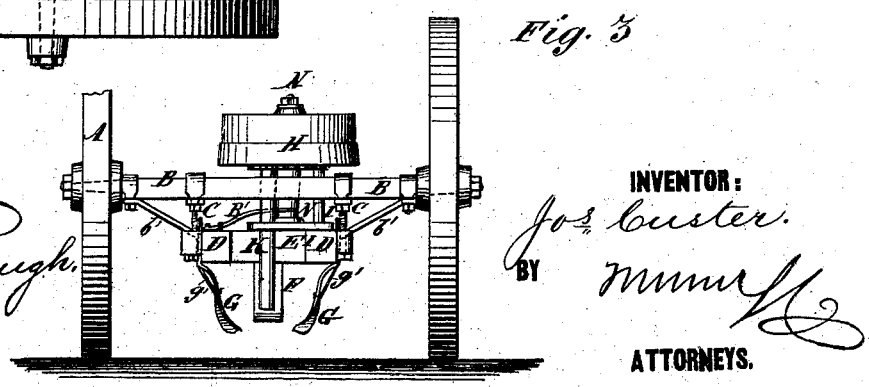
WITNESSES:
C. Neveux
F. H. Scarborough
INVENTOR:
Jos. Custer
BY
ATTORNEYS.

UNITED STATES PATENT OFFICE.

JOSEPH CUSTER, OF GOSHEN, OHIO.

IMPROVEMENT IN COMBINED POTATO AND CORN PLANTER.

Specification forming part of Letters Patent No. 191,838, dated June 12, 1877; application filed March 24, 1877.

*To all whom it may concern:*

Be it known that I, JOSEPH CUSTER, of Goshen, in the county of Clermont and State of Ohio, have invented a new and useful Improvement in Combined Potato and Corn Planter, of which the following is a specification:

Figure 1 is a vertical longitudinal section of the machine taken through the line $x\ x$, Fig. 2. Fig. 2 is a top view of the same arranged as a potato-planter. Fig. 3 is a rear view of the same, the handles and their standards and the front wheel being omitted. Fig. 4 is a detail top view of the seed-box and the dropping-plate for corn. Fig. 5 is a detail section of the same taken through the line $y\ y$, Fig. 4.

Similar letters of reference indicate corresponding parts.

The object of this invention is to furnish an improved seed-planter, which shall be so constructed that it may be readily adjusted for planting potatoes or corn, and which shall be simple in construction, convenient in use, and effective in operation.

The invention will first be described in connection with the drawing, and then pointed out in the claims.

A are the wheels, which revolve upon the journals of the axle B. To the end parts of the axle B are attached two clips, C, the arms of which project below the usual yoke and nuts, and pass through holes formed in, or sockets attached to, the rear parts of the side bars of the frame D, where they are secured in place by nuts screwed upon the lower ends. The axle B is further connected with the frame D by the braces $b'$, the rear ends of which are clipped to the said axle B, and their forward ends are bolted to the sides of the said frame D. This construction enables the wheels and axle A B to be detached when desired, and the machine used without them. To the middle part of the frame D is attached a platform, E, to the lower side of which is attached a plow or runner, F, to open a furrow to receive the seed. The seed is covered by the plow G, the standards of which are attached to the frame D, and are strengthened by braces $g'$, also attached to said frame D. H is the seed-box, which is connected with and supported from the plate P, that rests and slides upon the platform E by short posts I.

The seed-box H is made with a ring bottom, upon which rests the outer part of the circular dropping wheel or plate J. Through the outer part of the dropping-plate J is formed a circle of holes, each of such a size as to hold enough seed for a hill, which holes receive the seed and carry it over the discharge-hole in the ring bottom of the seed-box H. From the discharge-hole of the seed-box bottom the seed drops through the conducting-tube K into the furrow opened by the opener F. To the side of the seed-box H are attached the ends of the curved guard-plate L, which incloses the space around the discharge-hole through the bottom of said box, and beneath the lower edge of which the dropping plate or wheel J passes, so that no more seed can be carried out by said dropping-plate than is contained in its holes. To the forward part of the guard L is attached a knife, M, which, when planting potatoes, will cut off any parts of potatoes that may project above the plate J, to enable the rest of the potato to be carried within the guard L and dropped to the ground.

The guard L and knife M are adjustable, so that they may be adjusted according to the thickness of the dropping-plate J.

The upper part of the hub of the dropping-plate J is made large and conical, so that the seed may rest upon the part of said plate in which the dropping-holes are formed, to insure said dropping-wheels being properly filled. The hub of the dropping-plate J is placed and revolves upon a stud or spindle, N, attached to the plate P, that slides upon the platform E. Upon the lower side of dropping-plate J is formed a bevel-gear wheel, O, the teeth of which mesh into the teeth of the gear-wheel Q, attached to the rear end of the shaft R. The shaft R revolves in bearings attached to the platform E and frame D, and to its forward end is adjustably attached a gear-wheel, S, so that it may be adjusted to mesh into either of the concentric gear-wheels T, attached to the side of the wheel U, according as it is desired to plant the hills farther apart or closer together. The journals of the wheel U revolve in bearings attached to the frame D, and the said wheel is revolved by contact with the ground.

V are the handles, the forward ends of which are attached to the sides of the frame D. The handles V are connected by a round, W, and are supported at the proper height by the standards X, to which they are attached, and the lower ends of which are attached to the frame D.

To one of the standards X is pivoted a lever, Y, the lower end of which is pivoted to the sliding plate P, that carries the seed-box H, so that the said seed-box can be moved back and forth to throw the gear-wheels O and Q out of and into gear with each other, to stop and start the dropping device, by operating the said lever Y. The gear-wheels O Q are held in gear with each other by a spring, B', attached to the frame D, and which bears against the rear side of the spindle N.

A' is a plunger, working in keepers attached to the side of the seed-box H within the guard L, and directly over the discharge-hole in the bottom of the said seed-box, so that it may be forced down to clear any of the dropping-holes, should they become clogged. The plunger A' is held up by a spring when not required for use.

Having thus described my invention, I claim as new and desire to secure by Letters Patent—

1. The axle B, long-armed clips C, and pivoted braces b', in combination with planter-frame D, pilot-wheel U, and hopper H, substantially as described.

2. The combination, with frame D and sliding hopper H, of the dropping-plate J having bevel-wheel O, the shaft R having gear-wheels Q S, and the concentric wheels T T on the side of ground-wheel U, as and for the purpose set forth.

3. The combination, with hopper H, of the dropping-wheel J, guard L, and knife M, as and for the purpose specified.

JOSEPH CUSTER.

Witnesses:
 HARVEY IRWIN,
 GEO. W. FAGIN.